April 10, 1956     J. B. COX     2,741,280
SAW CHAIN WITH SAW BAR GROOVE CLEANING MEANS
Filed Sept. 15, 1951
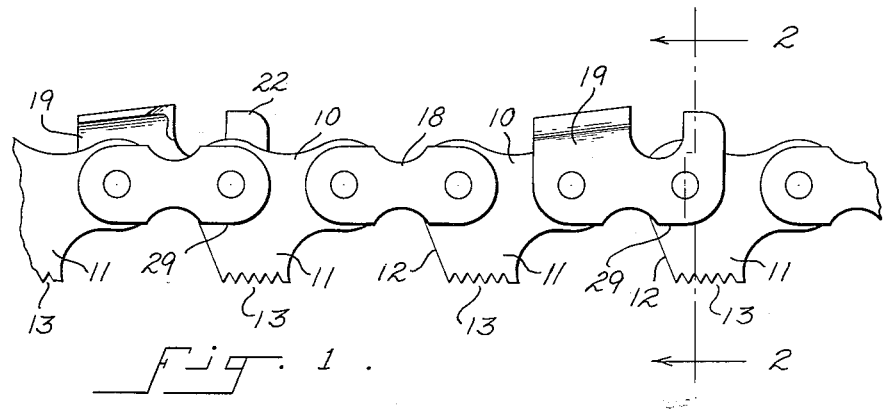
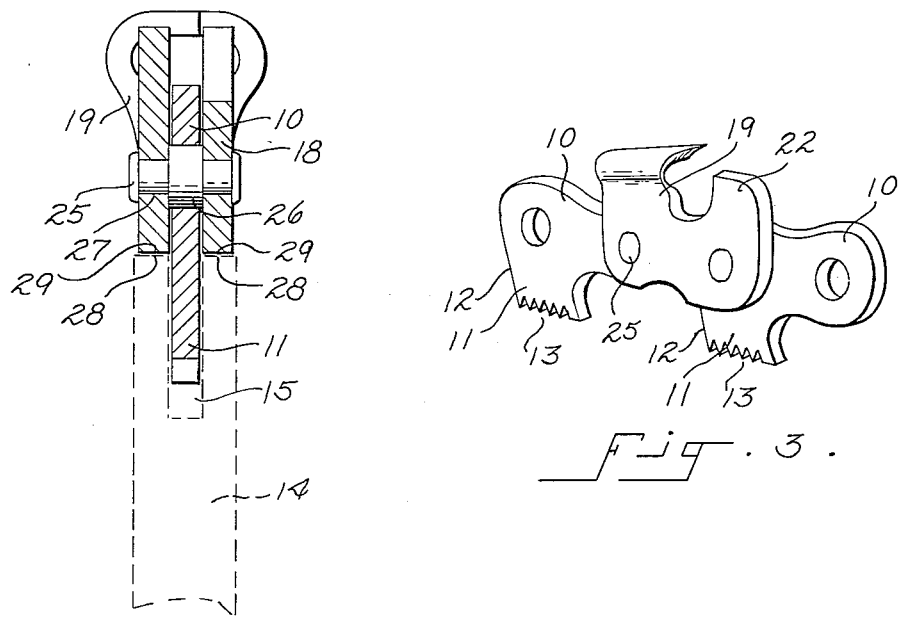
INVENTOR.
JOSEPH B. COX
BY Buckhorn and Cheatham
Attorneys

United States Patent Office 2,741,280
Patented Apr. 10, 1956

2,741,280

SAW CHAIN WITH SAW BAR GROOVE CLEANING MEANS

Joseph B. Cox, Portland, Oreg., assignor, by mesne assignments, to Oregon Saw Chain Corp., a corporation of Oregon Application September 15, 1951, Serial No. 246,750

4 Claims. (Cl. 143—135)

This invention relates to saw chains.

Operation of chain saws having grooved type saw bars is often hampered by the accumulation of sawdust, dirt, pitch and the like, packed within the groove to such an extent that the depth of the groove becomes less than the height of the saw chain link root portions riding therein. When this occurs, firm riding contact of the saw chain upon the bar is prevented, rendering the chain unstable in operation and causing uneven wear of the saw bar.

It is an object of this invention to provide an improved construction in saw chains whereby accumulation of dirt, grime, pitch and sawdust in the groove of the saw bar during operation of the saw is prevented.

It is a further object of this invention to provide an improved construction of saw chains which will result in a longer useful service of the saw bar upon which the saw chain is mounted.

It is a further object to provide a saw chain having a new and improved saw bar groove cleaning means formed on the root portions thereof.

In accordance with the present invention, the end surface of each of the root portions of the saw chain links is formed with cutting elements thereon whereby pitch, sawdust and the like may be cut or scraped away from the bottom of the saw bar slot in which the root portion rides. Such cutting elements may also serve to rout out the bottom of the saw bar groove to restore the depth of the groove as the upper chain sliding surfaces become worn.

These and other objects and advantages of the present invention will become apparent from the following description.

In the drawings,

Fig. 1 is a side elevation of a saw chain constructed in accordance with one form of the present invention;

Fig. 2 is a cross-sectional view taken along the line 2—2 of Fig. 1; and

Fig. 3 is a view in perspective showing a cutting tooth and linking elements as incorporated in view of Fig. 1.

Referring now to the drawings, the saw chain of this invention consists of a plurality of centrally disposed links 10 longitudinally spaced apart and having sprocket-engaging root portions 11 depending from the lower edge thereof. Links 10 are pivotally joined together by means of pairs of oppositely disposed side plates 18 and 19. Side plates 18 are identical with each other, whereas side plates 19 have hook-shaped cutting teeth formed on the upper ends thereof and are provided with a depth gauge 22 ahead of the tooth. Alternate tooth plates 19 are of right and left configuration as seen in Fig. 1 and are mounted between the connecting links 10. Links 10 have sprocket-engaging root portions 11 depending from the lower edge thereof, the rear edge 12 of the root portion 11 sloping at an angle corresponding to the angle of the faces of the driving sprocket teeth (not shown). Root portions 11 of the links 10 are adapted to ride within the guiding slot 15 of the saw bar indicated generally by 14 in Fig. 2.

The lower end surface of the root portions 11 is elongated longitudinally of the chain, said surface being adapted to extend substantially parallel to the bottom of the saw bar slot 15. In the present invention the bottom end surfaces of root portions 11 are provided with cutting teeth 13 defining cutting edges extending substantially at right angles to the longitudinal center line of the chain, the purpose of which teeth will be described more fully subsequently.

As shown in the enlarged view of Fig. 2, the central link 10 and side plate elements 18 and 19 are pivotally connected together by means of pivot pins 25, the central portions of the pivot pins being provided with an enlarged annular shoulder 26 having a width very slightly greater than the thickness of the central link member 10 and a diameter slightly less than the cooperating opening provided therein, so that the link member 10 may pivot freely thereabout. The ends of the pins 25 are spun over, so as to be of greater diameter than the holes 27 through the side plates 18 and 19.

In the groove-type saw bar construction as indicated in Fig. 2, the guiding slot 15 in saw bar 14 is initially cut deep enough so that the ends of the cutting teeth 13 of root 11 ride clear of the bottom portion of the slot 15, the entire load on the chain being borne on the surface 29 of the side plates 18 and 19 and the upper surfaces 28—28 of the side members of the slot. During the operation of the saw, sawdust, pitch and other foreign matter tend to accumulate in the bottom of the slot 15. The great amount of heat developed by the friction of the chain passing around the saw bar causes the pitch to harden. In conventional types of saw chains having a simple plane surface instead of the teeth 13 of the present invention at the end of root 11, the pitch and foreign matter accumulates and increases in depth until eventually the end surface of the root is riding on the accumulated matter. This causes the chain to be lifted partially out of the groove and prevents contact between the supporting surfaces 28—28 of the saw bar and the sliding surfaces 29—29 of the saw chain. Further operation under such conditions causes the saw chain to wobble from side to side and surfaces 28—28 and 29—29 to wear unevenly whereby the saw quickly reaches a point where operation is inefficient if not outright dangerous. Further difficulties arise in that surfaces 28 and 29 gradually wear each other away so that the end surface of the root 11 engages the bottom of slot 15. When this occurs, surfaces 28 and 29 are worn unevenly due to the wobble which develope, and a similar inefficient and dangerous condition arises as with the circumstances stated above.

The present invention is devised to eliminate these difficulties by providing cutting elements upon the end surface of root 11. These cutting elements may be saw-like teeth as illustrated or the end of the root may be provided with a file-like surface. In either case, that portion of the root is hardened or plated with hard material such as hard chrome. In the instance of accumulating material, the teeth 13 will cut it away and it will be moved out of the groove as it accumulates so that it cannot build up to the point where surfaces 28—28 and 29—29 are disengaged. Since no buildup of the foreign matter can take place, it is not necessary to take the saw out of operation and dismantle it to clean out the groove manually.

During the operation of a chain saw, the opposite guide rails of the saw bar wear away and particularly around the rounded nose of the bar where the rails generally wear down many times faster than on the long, relatively straight side portions of the saw bar. The cutting teeth 13 in accordance with the present invention are effective in routing out the bottom of the saw bar slot 15 as the rails wear away permitting the surfaces 28 of the saw bar and 29 of the saw chain side plates to remain in contact. The provision of a number of teeth on the root portion spaced longitudinally of the root is particularly important in routing out the bottom of a slot around the nose of a saw bar since one or more of the teeth will always be in contact with the bottom of the slot though only the middle portion of the end of the root will contact the bar due to the tangential relation of the end of the root to the curved surface of the slot. The end result of routing out the bottom of the saw bar slot is to lengthen the life of a saw bar considerably and without the necessity of taking the saw out of operation to mill or grind out the slot as has been done heretofore when the rails are worn down.

Having described the invention in what I consider to be a preferred embodiment, I desire to protect by the following claims all other modifications which may readily occur to one skilled in the art but falling within the spirt and scope of my present invention.

I claim:

1. In a saw chain link having a root portion adapted to ride within the guiding slot of a saw bar, said root portion having an elongate end surface, the improvement comprising a plurality of cutting elements formed on said end surface of said root portion and spaced longitudinally thereof.

2. In a saw chain link having a root portion adapted to ride within the guiding slot of a saw bar, said root portion having an elongate end surface adapted to extend substantially to the bottom of said slot, the improvement comprising a plurality of cutting teeth formed on said end surface of said root portion and spaced longitudinally thereof, said cutting edges extending substantially at right angles to the longitudinal center line of said chain.

3. In a saw chain link having an elongate root portion adapted to ride within the guiding slot of the saw bar, the invention comprising a plurality of hard surfaced cutting elements formed on the end surface of said root portion and spaced longitudinally thereof.

4. In a saw chain link having an elongate root portion adapted to ride within the guiding slot of a saw bar, the invention comprising a plurality of cutting teeth formed on the end surface of said root portion and spaced longitudinally thereof and a layer of a hard surfacing material on said cutting teeth.

References Cited in the file of this patent

UNITED STATES PATENTS

| | | |
|---|---|---|
| 324,600 | Shoemaker | Aug. 18, 1885 |
| 1,631,212 | King | June 7, 1927 |
| 2,351,738 | Blum | June 20, 1944 |
| 2,409,775 | Mall et al. | Oct. 22, 1946 |
| 2,446,774 | Mall | Aug. 10, 1948 |
| 2,558,678 | Garrett | June 26, 1951 |